US010823833B2

(12) United States Patent
Reuter

(10) Patent No.: US 10,823,833 B2
(45) Date of Patent: Nov. 3, 2020

(54) APPARATUS FOR DETECTION AND RANGING

(71) Applicant: NXP B.V., Eindhoven (NL)

(72) Inventor: Ralf Reuter, Landshut (DE)

(73) Assignee: NXP B.V., Eindhoven (NL)

( * ) Notice: Subject to any disclaimer, the term of this patent is extended or adjusted under 35 U.S.C. 154(b) by 336 days.

(21) Appl. No.: 15/975,122

(22) Filed: May 9, 2018

(65) Prior Publication Data
US 2018/0348354 A1    Dec. 6, 2018

(30) Foreign Application Priority Data

May 30, 2017   (EP) .................................... 17173566

(51) Int. Cl.
*G01S 13/26*  (2006.01)
*G01S 13/34*  (2006.01)
(Continued)

(52) U.S. Cl.
CPC .............. *G01S 13/26* (2013.01); *G01S 7/023* (2013.01); *G01S 7/282* (2013.01); *G01S 7/2921* (2013.01);
(Continued)

(58) Field of Classification Search
CPC ........ G01S 7/023; G01S 13/26; G01S 13/343; G01S 13/345; G01S 13/931
See application file for complete search history.

(56) References Cited

U.S. PATENT DOCUMENTS 7,158,077 B2 *  1/2007  Brosche .................. G01S 7/023
                                                  342/134
8,599,062 B2 * 12/2013  Szajnowski ............. G01S 7/023
                                                  342/104
(Continued)

FOREIGN PATENT DOCUMENTS

DE          19601875 A1    7/1997
DE       102006020943 A1   11/2007

OTHER PUBLICATIONS

Maxim > Design Support > Technical Documents > Application Notes > General Engineering Topics > APP 4400; Maxim > Design Support > Technical Documents > Application Notes > Microcontrollers > APP 4400; "Pseudo Random Number Generation Using Linear Feedback Shift Registers", Jun. 30, 2010.

*Primary Examiner* — Peter M Bythrow

(57) ABSTRACT

A controller for a FMCW radar system configured to:
provide for emission by the FMCW radar system of a plurality of consecutive frequency modulated detection signals for detection and ranging, each of the frequency modulated detection signals varying between an initial frequency and a final frequency over a period of time extending from a start time to an end time; wherein
at least one of said consecutive frequency modulated detection signals is provided with an offset to one or more of:
the start time of the detection signal relative to a predetermined start time schedule;
the end time of the detection signal relative to a predetermined end time schedule;
the initial frequency of the detection signal relative to a predetermined initial frequency schedule; and
the final frequency of the detection signal relative to a predetermined final frequency schedule;
the offset based on a random value.

20 Claims, 3 Drawing Sheets

(51) Int. Cl.
 *G01S 7/02* (2006.01)
 *G01S 7/282* (2006.01)
 *G01S 7/292* (2006.01)
 *G01S 13/22* (2006.01)
 *G01S 13/931* (2020.01)

(52) U.S. Cl.
 CPC .......... *G01S 13/222* (2013.01); *G01S 13/343* (2013.01); *G01S 13/931* (2013.01)

(56) References Cited

U.S. PATENT DOCUMENTS

| | | | | |
|---|---|---|---|---|
| 9,182,476 | B2* | 11/2015 | Wintermantel | G01S 7/023 |
| 9,575,160 | B1* | 2/2017 | Davis | G01S 7/35 |
| 9,791,551 | B1* | 10/2017 | Eshraghi | G01S 13/347 |
| 10,495,728 | B2* | 12/2019 | Frick | G01S 13/345 |
| 10,557,931 | B2* | 2/2020 | Schoor | G01S 13/584 |
| 2002/0130810 | A1* | 9/2002 | Gottwald | G01S 13/225 |
| | | | | 342/159 |
| 2003/0179131 | A1 | 9/2003 | Brosche | |
| 2009/0309785 | A1* | 12/2009 | Nalezinski | H03L 7/099 |
| | | | | 342/200 |
| 2010/0245154 | A1* | 9/2010 | Szajnowski | G01S 7/023 |
| | | | | 342/90 |
| 2010/0289692 | A1* | 11/2010 | Winkler | G01S 7/4008 |
| | | | | 342/70 |
| 2012/0146835 | A1* | 6/2012 | Gross | G01S 13/584 |
| | | | | 342/109 |
| 2012/0235854 | A1* | 9/2012 | Testar | G01S 13/343 |
| | | | | 342/109 |
| 2014/0022111 | A1* | 1/2014 | Kuehnle | G01S 13/584 |
| | | | | 342/109 |
| 2015/0301172 | A1* | 10/2015 | Ossowska | G01S 13/878 |
| | | | | 342/70 |
| 2015/0331096 | A1* | 11/2015 | Schoor | G01S 13/345 |
| | | | | 342/112 |
| 2016/0124075 | A1* | 5/2016 | Vogt | G01S 13/325 |
| | | | | 342/13 |
| 2018/0252797 | A1* | 9/2018 | Frick | G01S 13/882 |

\* cited by examiner

APPARATUS FOR DETECTION AND RANGING

CROSS-REFERENCE TO RELATED APPLICATIONS

This application claims the priority under 35 U.S.C. § 119 of European Patent application no. 17173566.5, filed on 30 May 2017, the contents of which are incorporated by reference herein.

The present disclosure relates to an apparatus for detection and ranging of a remote object. It also relates to associated methods and computer programs.

According to a first aspect of the present disclosure there is provided a controller for a FMCW radar system configured to:

provide for emission by the FMCW radar system of a plurality of consecutive frequency modulated detection signals for detection and ranging, each of the frequency modulated detection signals varying between an initial frequency and a final frequency over a period of time extending from a start time of the frequency modulated detection signal to an end time of the frequency modulated detection signal; wherein at least one of said consecutive frequency modulated detection signals is provided with an offset to one or more of: the start time of the frequency modulated detection signal relative to a predetermined start time schedule; the end time of the frequency modulated detection signal relative to a predetermined end time schedule; the initial frequency of the frequency modulated detection signal relative to a predetermined initial frequency schedule; and the final frequency of the frequency modulated detection signal relative to a predetermined final frequency schedule, the offset based on a random value.

In one or more embodiments, the offset to one or more of: the start time of the frequency modulated detection signal relative to a predetermined start time schedule; the end time of the frequency modulated detection signal relative to a predetermined end time schedule; the initial frequency of the frequency modulated detection signal relative to a predetermined initial frequency schedule; and the final frequency of the frequency modulated detection signal relative to a predetermined final frequency schedule may be applied to at least two of the frequency modulated detection signals, each offset based on a different random value.

In one or more embodiments, the offset to one or more of: the start time of the frequency modulated detection signal relative to a predetermined start time schedule; the end time of the frequency modulated detection signal relative to a predetermined end time schedule; the initial frequency of the frequency modulated detection signal relative to a predetermined initial frequency schedule; and the final frequency of the frequency modulated detection signal relative to a predetermined final frequency schedule may be applied to each of the frequency modulated detection signals, each offset based on a different random value.

In one or more embodiments, the frequency modulated detection signal may comprise a chirp, wherein the chirp comprises a sequential emission of frequencies from the initial frequency to the final frequency.

In one or more embodiments, the random value may be a pseudo-random value. In one or more embodiments, the pseudo-random value may be generated by a linear-feedback shift register. In one or more embodiments, the pseudo-random value may be generated by a 12 bit linear-feedback shift register.

In one or more embodiments, the offset may comprise a maximum offset value multiplied by a factor between −1 and 1, the factor determined from the random value.

In one or more examples,
in the case the offset is applied to the start time, the factor determined from the random value may be multiplied by a predetermined maximum start time offset to provide an offset start time;
in the case the offset is applied to the end time, the factor determined from the random value may be multiplied by a predetermined maximum end time offset to provide an offset end time;
in the case the offset is applied to the initial frequency, the factor determined from the random value may be multiplied by a predetermined maximum initial frequency offset to provide an offset initial frequency; and
in the case the offset is applied to the final frequency, the factor determined from the random value may be multiplied by a predetermined maximum final frequency offset to provide an offset final frequency.

In one or more embodiments, the offset to the start time of the frequency modulated detection signal and the offset to the end time of the frequency modulated detection signal may be based on the same random value.

In one or more embodiments, the time difference between the start time and the end time may comprise a fixed predetermined time and, correspondingly, any offset applied to the start time and the end time may be equally applied to the other of the end time and the start time.

In one or more embodiments, the offset to the initial frequency of the frequency modulated detection signal and the offset to the final frequency of the frequency modulated detection signal may be based on the same random value.

In one or more embodiments, the frequency difference between the initial frequency and the final frequency may comprise a fixed predetermined frequency difference and, correspondingly, any offset applied to one of the initial frequency and the final frequency may be equally applied to the other of the final frequency and the initial frequency.

In one or more embodiment, the start time and end time schedules may define non-overlapping emission windows, each of the plurality of frequency modulated detection signals may be emitted during a non-overlapping emission window, and wherein the offset to one or more of the start time of the frequency modulated detection signal and the end time of the frequency modulated signal may be offset relative to the start of or the end of the emission window.

In one or more embodiment, each of the plurality of frequency modulated detection signals may be separated by at least one pause signal, which may comprise a signal wherein the frequency emitted by the FMCW radar system remains constant, and a ramp signal, which may comprise a signal wherein the frequency emitted by the FMCW radar system varies monotonically from the final frequency to the initial frequency.

In one or more embodiments, the FMCW radar system may be configured to provide for continuous emission of at least two of the frequency modulated detection signals separated by the ramp signal and the controller may provide for application of the offset to at least one of the frequency modulated detection signals.

In one or more embodiments, the controller for a FMCW radar system may provide for discrete emission of the frequency varying detection signals interspaced with periods of no emission by the FMCW radar system. In one or more embodiments, the emission window further may comprise at least one ramp period over which the frequency is reset to the initial frequency.

In one or more embodiments, the controller may provide for detection of a reflected detection and ranging signal according to a predetermined detection schedule which may be independent of any offset applied to the one or more of the start time, the end time, the initial frequency or the final frequency.

In one or more embodiments, one or more of: the start time or end time schedule may define regular time points at which a frequency modulated detection signal starts or ends respectively; the start time or end time schedule may define a time point at which a frequency modulated detection signal should be emitted relative to the preceding frequency modulated detection signal; the initial frequency schedule may define a default initial frequency; and the final frequency schedule may define a default final frequency.

According to a second aspect of the present disclosure, there is provided a FMCW radar system controlled by the controller of the first aspect and a random value generator configured to provide the random value to the controller.

According to a third aspect of the present disclosure, there is provided an automobile comprising the FMCW radar system of the second aspect.

According to a fourth aspect of the present disclosure, there is provided a method of controlling a FMCW radar system comprising:
 providing for emission by the FMCW radar system of a plurality of consecutive frequency modulated detection signals for detection and ranging, each of the frequency modulated detection signals varying between an initial frequency and a final frequency over a period of time extending from a start time of the frequency modulated detection to an end time of the frequency modulated detection signal; and
 providing at least one of the frequency modulated detection signals with an offset to one or more of: the start time of the frequency modulated detection signal relative to a predetermined start schedule; the end time of the frequency modulated detection signal relative to a predetermined end time schedule; the initial frequency of the frequency modulated detection signal relative to a predetermined initial frequency schedule; and the final frequency of the frequency modulated detection signal relative to a predetermined final frequency schedule, the offset based on a random value.

According to a fifth aspect of the present disclosure, there is provided a computer program product comprising computer program code which, when executed by a processor, is configured to perform the method of the fourth aspect.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

Figure 1:
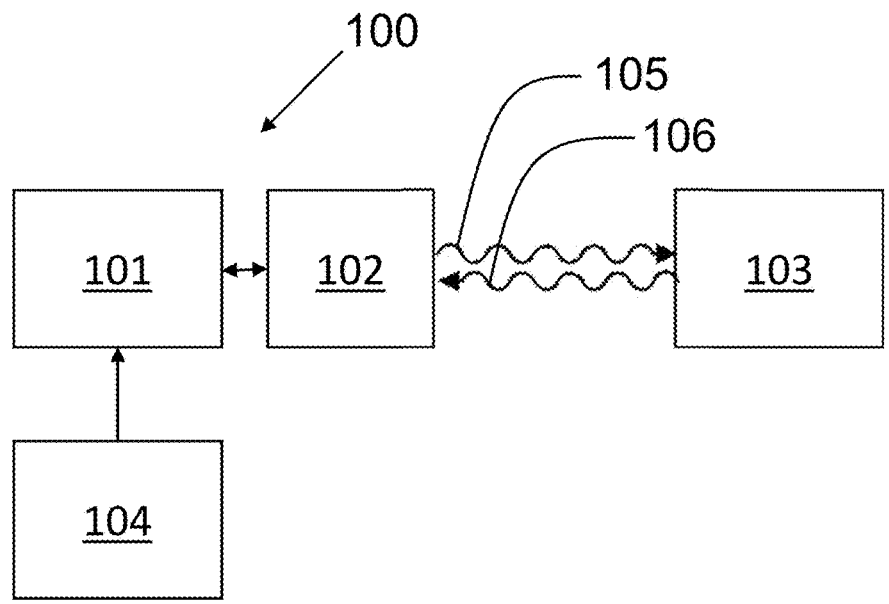
FIG. 1 shows a schematic diagram showing an example embodiment of an apparatus including the controller and a FMCW radar system.

Radar systems are becoming increasingly common in the automotive industry. These systems are used, for example, as sensors for assisted parking, automatic cruise control speed adjustment (adaptive cruise control), headway alert, collision warning and mitigation and brake support. We describe example embodiments that may provide for an advantageous radar system with the potential to have low interference with other radar systems.

Radar (originally an acronym. RADAR) stands for RAdio Detection And Ranging. While radar technology was originally directed towards the use of radio frequency electromagnetic waves for detection and ranging, this term is now often used generically for electromagnetic waves of any frequency that are used for detection and ranging purposes.

A radar system may perform detection and ranging by transmitting an electromagnetic wave, such as a pulse, from a transmission antenna and measuring the time taken for the reflected signal to be detected at a receiving sensor. The amount of time taken for a reflected signal to reach an obstacle and be reflected back provides an indication of the range of that obstacle from the radar system. By using a series of pulses or a continuous wave mode of operation (such as in a frequency modulated continuous wave radar system), a time-resolved range profile of a space around a radar system may be obtained. It will be appreciated that any action which includes the ranging of a remote object will inherently include the action of detecting said remote object.

Frequency modulated continuous wave (FMCW) radar systems operate by the emission of continuous electromagnetic waves (a signal) that varies between an initial frequency and a final frequency over a period of time. The frequency modulation of the FMCW is provided by the variation in the frequency of the signal over time. The bandwidth of a FMCW radar signal may comprise the difference in frequency between the initial frequency and the final frequency. The operation of FMCW radar system will be known to those skilled in the art, but in summary, the signal reflects from objects, resulting in a reflected signal. At the times during which detection of the reflected signal occurs, the FMCW radar system is configured such that it is still emitting the detection signal. The received reflected signal is mixed with the detection signal at the time of receipt and because the frequency of the detection signal varies, the frequency of the detection signal at the time of receipt of the reflected signal is different to the frequency of the reflected signal. Due to the difference in detection and reflection signal frequencies, a beat frequency is obtained when the detection and reflected signals are mixed. The distance of the remote object or objects from the FMCW radar system can be determined from the beat frequency.

Errors can arise in a FMCW radar system when signals of similar frequencies to the detection signal, such as those from other radar systems, are received by the radar system. The receipt of similar signal frequencies may result in the apparent detection of objects which are not there, or may result in the misestimation of the distance to a remote object. As FMCW radar systems are becoming more ubiquitous, the opportunity for interference between different FMCW radar system is increasing.

FIG. 1 shows an apparatus 100 configured to provide for detection and ranging of a remote object 103. In this example, the apparatus 100 may comprise a controller 101 configured to control a frequency modulated continuous wave (FMCW) radar system 102 based on a random value generated by a random value generator 104. The controller 101 for the FMCW radar system 102 is configured to: provide for emission by the FMCW radar system 102 of a plurality of consecutive frequency modulated detection signals 105 for detection and ranging, each of the frequency modulated detection signals 105 varying between an initial frequency and a final frequency over a period of time extending from a start time of the frequency modulated detection signal 105 to an end time of the frequency modulated detection signal 105; wherein at least one of said consecutive frequency modulated detection signals 105 is provided with an offset to one or more of: the start time of the frequency modulated detection signal 105 relative to a predetermined start time schedule, the end time of the frequency modulated detection signal 105 relative to a predetermined end time schedule; the initial frequency of the frequency modulated detection signal 105 relative to a predetermined initial frequency schedule; and the final frequency of the frequency modulated detection signal 105 relative to a predetermined final frequency schedule, the offset based on a random value.

The controller 101 may be configured to provide signalling to the FMCW radar system to cause emission, by the FMCW radar system 102, of the plurality of consecutive frequency modulated detection signals 105 for detection and ranging.

The use of the offset based on a random value may reduce the opportunity for interference in at least some embodiments. For example, emission of a detection signal at a regular start or end time may happen to be in synchronisation with a detection signal from other nearby FMCW radar systems. However, by providing for application of a random offset, in the start/end time of one, some, or all of the frequency modulated detection signals the chance of two systems emitting a frequency modulated detection signal at the same time may be reduced as well as the chance of interference.

In another example, emission of a detection signal at a regular initial frequencies or final frequencies may happen to be in synchronisation with a detection signal from other nearby FMCW radar systems. Alternatively, by providing for application of a random offset in the initial/final frequency of one, some, or all of the frequency modulated detection signals, the chance of two systems emitting a frequency modulated detection signal at the same time may be reduced and, thereby, the chance of interference may be reduced.

In one or more embodiments, the random value generator 104 may be configured to provide a true random value, such as one which is generated using a random audio noise generator or a random thermal noise generator. Consecutively generated true random values generated by random noise generators are entirely independent of each other. The statistical chance of the output of two random value generators being the same is vanishingly small.

Alternatively, the random value generator 104 may be configured to provide a pseudo-random value generated by a pseudo-random value generator. Pseudo-random values appear to an observer to be random, however, the values are generated based on a predetermined algorithm. While the values appear random, the values are actually based on one or more initial values which are input into the pseudo-random value generator. The initial values input into a pseudo-random value generator are often called seed values or simply seeds. With the same seed values, a pseudo-random value generator will produce the same set of pseudo-random values, providing for repeatable and predictable value generation. Example pseudo-random value generators may include, as a non-exhaustive list of examples: a linear feedback shift register; a linear congruential generator; a Blum Blum Shub; or a Mersenne Twister algorithm.

While in FIG. 1, the random value generator 104, is shown separate from the controller 101, it will be appreciated that in other embodiments, the random value generator 104 may be part of the controller 101 in order provide the one or more random offsets. The random value generator 104 may generate a plurality of random values, each applied to one or more of the start time, end time, initial frequency, and final frequency of one or more of the frequency modulated detection signals. In one or more examples, the start time of consecutive signals may vary randomly by application of the offset. In one or more examples, the initial and/or final frequency of consecutive signals may vary randomly by applications of the offset. The random variation between detection signals may reduce the opportunity for interference.

In one or more examples, the controller may provide a maximum offset from the schedule and the random value may provide for generation of a random offset within said maximum offset. In some embodiments, the offset may comprise maximum offset value multiplied by a factor between −1 and 1, the factor determined from the random value. Accordingly, the maximum offset value provides a maximum bound on the possible deviation from the scheduled value that may be provided by the offset and the random value provides for application of a random offset within that maximum deviation. Each of the start time, end time, initial frequency and final frequency may each be considered as a different parameter of the frequency modulated detection signals. Each of the parameters of the frequency modulated detection signal may be associated with a maximum allowable offset which can be applied to that parameter. For example, the maximum allowable offset to the initial frequency may be selected based on the maximum/minimum frequency signal which the FMCW radar system can produce or by the maximum/minimum frequency allowable for a radar system according to national frequency allocation regulations. The maximum allowable start time offset may be bounded by the scheduled delay between frequency modulated detection signals as defined by the start time schedule. The randomly derived factor may be multiplied by the maximum allowable offset associated with the parameter to provide for the offset parameter.

In other embodiments, the factor may not be between −1 and 1. For example, the factor may be between 0 and 1, and wherein the sign of the offset is determined separately from the generation of the random value. Alternative ranges may also be possible. It will be appreciated that in some embodiments other mathematical methods of determining the offset parameter may be implemented, such as adding or subtracting the random value from the scheduled parameter. The maximum allowable offset for each parameter of each frequency modulated detection signal may be the scheduled parameter, such as the scheduled start time, the scheduled end time, the scheduled initial frequency or the scheduled final frequency. Alternatively, the scheduled parameter may be used as a default parameter which is used only if an offset parameter is not provided.

In yet further embodiments, a periodic clock signal may be used to initiate and terminate the frequency modulated detection signal. In such embodiments, it may only be possible to either initiate or terminate the frequency modulated detection signals once per duty cycle of the clock signal. The effect of using a clock signal is, therefore, that a continuum of possible start times and end times is not possible and, instead, discrete time-spaced intervals are available for the initiation or termination of frequency modulated detection signals. In these examples, the random value may be multiplied by a minimum increment value defined by the frequency of the clock signal, such that the offset is determined as an integer multiple of minimum increment values. In some embodiments, the clock signal may define a minimum granulation between available offset values to the start time or the end time.

Figure 2:
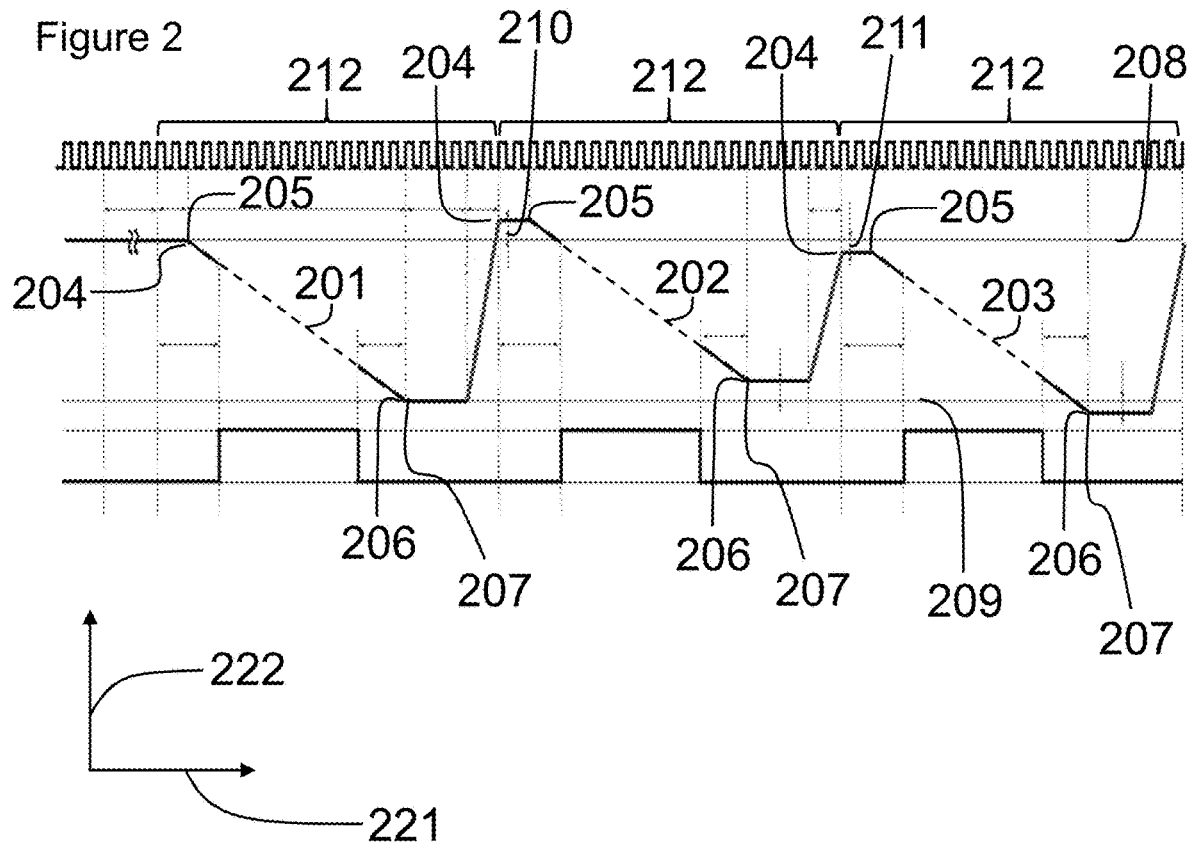
FIG. 2 shows an example diagram of the variation in the frequency output of a FMCW radar system over time wherein the initial frequency and the final frequency are offset.

FIG. 2 shows an example set of frequency modulated detection signals 201, 202, 203, Each frequency modulated detection signal varies between an initial frequency 204, emitted at a start time 205, and a final frequency 206, emitted at an end time 207. In this example, the initial frequency 204 and the final frequency 206 of each of the second and third frequency modulated detection signals 202, 203 have been offset based on different random values, relative to the first frequency modulated detection signal 201 for which no offset is applied. Arrow 221 represents the x-axis, which in this example is the time axis. Arrow 222 represents the y-axis, which in this example is the frequency axis.

The initial frequency 204 may be larger than the final frequency 206, as in FIG. 2, or the initial frequency 204 may be smaller than the final frequency 206. Between the emission of the initial frequency 204 and the final frequency 206, a plurality of intermediate frequencies is emitted. The intermediate frequencies are emitted sequentially such that a continuous emission of frequencies between the initial frequency 204 and the final frequency 206 is provided in either ascending order, where the initial frequency 204 is smaller than the final frequency 206, or in descending order, where the initial frequency 204 is larger than the final frequency 206. It will be appreciated that, although a linear sweep of the intermediate frequencies between the initial and final frequencies is shown, in other embodiments, this may not be the case.

The initial frequency 204 of each of the plurality of frequency modulated detection signals 201, 202, 203 may be determined according to a predetermined initial frequency schedule which defines a default initial frequency. The initial frequency of a particular frequency modulated detection signal may be offset relative to the default initial frequency defined in the schedule based on the random value. The initial frequency schedule may comprise an ordered plurality of scheduled initial frequencies which inform the controller 101 as to the appropriate initial frequency 204 to use for each of the consecutive frequency modulated detection signals 201, 202, 203. Each of the scheduled initial frequencies in the schedule of initial frequencies may be different. Alternatively, each of the scheduled initial frequencies in the schedule of initial frequencies may be the same frequency, such that each of the frequency modulated detection signals 201, 202, 203 are scheduled to be emitted with the same default initial frequency. The emitted initial frequency 204 of the frequency modulated detection signal 201, 202, 203, 204 may be offset from the scheduled initial frequency of the schedule of initial frequencies based on the random value.

The final frequency 206 of each of the plurality of frequency modulated detection signals 201, 202, 203 may be determined according to a predetermined final frequency schedule which defines a default final frequency. The final frequency of a particular frequency modulated detection signal may be offset relative to the default initial frequency defined in the schedule based on the random value. The final frequency schedule may comprise an ordered plurality of scheduled final frequencies which inform the controller 101 as to the appropriate final frequency 206 to use for each of the consecutive frequency modulated detection signals 201, 202, 203. Each of the scheduled final frequencies in the schedule of final frequencies may be different. Alternatively, each of the scheduled final frequencies in the schedule of final frequencies may be the same frequency, such that each of the frequency modulated detection signals 201, 202, 203 are emitted with the same default final frequency 206. The emitted final frequency 206 of the frequency modulated detection signal 201, 202, 203 204 may be offset from the scheduled final frequency of the schedule of final frequencies based on the random value.

In one or more embodiments, the frequency difference between the emitted initial frequency 204 and the emitted final frequency 206 may be the same for each of the plurality of frequency modulated detection signals 201, 202, 203. Accordingly, the schedule of initial frequencies and schedule of final frequencies may be provided by a frequency schedule defining a default bandwidth as a default initial frequency over which and from which the fixed bandwidth frequency modulated detection signal is provided.

In FIG. 2, the scheduled initial frequency 204 is the same for each of the frequency modulated detection signals 201, 202, 203 and is represented by line 208. Similarly, the scheduled final frequency is the same for each of the frequency modulated detection signals and is represented by line 209. It can be seen that the initial frequency 204 and the final frequency 206 of the second frequency modulated detection signal 202 are offset by a positive random amount 210 from the default frequency 208, 209. In contrast, the initial frequency 204 and the final frequency 206 of the third frequency modulated detection signal 203 are offset by a different, random, negative amount 211 in comparison to the scheduled initial and final frequencies.

In some examples the start time and end time schedule define a plurality of non-overlapping emission windows 212 during each of which one of the plurality of frequency modulated detection signals 201, 202, 203 may be emitted. In some embodiments, the offset to one or more of the start time 205 and the end time 207 may be offset relative to the start or the end of the emission window 212. Thus, where the start time 205 of two frequency modulated detection signals 201, 202, 203 is referred to as being equal, this would not mean that the two signals are emitted simultaneously, but that the signals are emitted at an equal amount of time after the start of their respective emission windows 212. The length of an emission window 212 may be independent of any offset which is applied to the parameters 204, 205, 206, 207 of the frequency modulated detection signal 201, 202, 203.

In FIG. 2, the start time and end time of the signals are not offset and are instead defined by the associated schedule, which in this example provides for a regular emission of frequency modulated detection signals.

Figure 3:
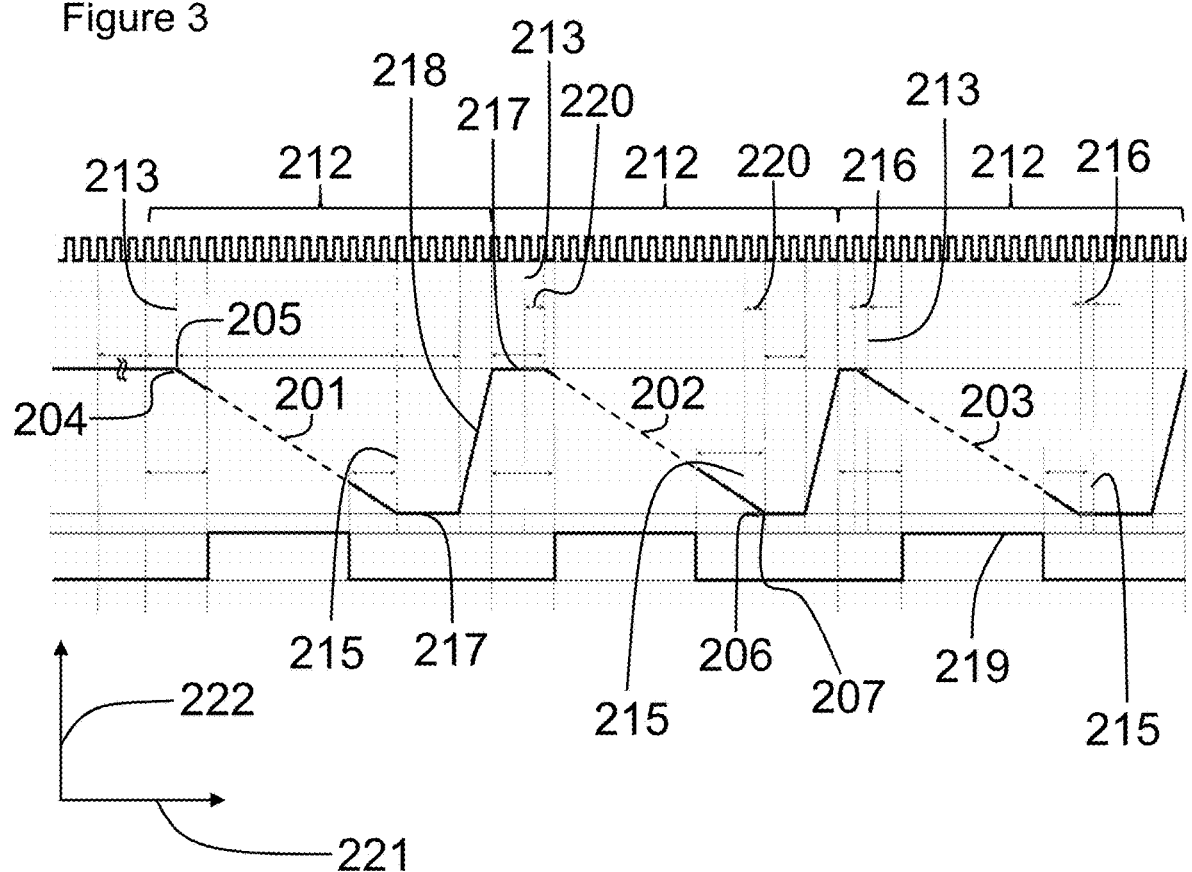
FIG. 3 show an example graph of the variation in the frequency output of a FMCW radar system over time wherein the start time and the end time are offset.

FIG. 3 shows a second example set of frequency modulated detection signals 201, 202, 203. Each frequency modulated detection signal 201, 202, 203 varies between an initial frequency 204, emitted at a start time 205, and a final frequency 206, emitted at an end time 207. In this example, the start time 205 and the end time 207 of each of the second and third frequency modulated detection signals 202, 203 have been offset based on different random values. It will be appreciated that different random values generated by a random number generator or a pseudo-random value generator refers to separately generated random values. Arrow 221 represents the x-axis, which in this example is the time axis. Arrow 222 represents the y-axis, which in this example is the frequency axis.

The start time 205 of each of the plurality of frequency modulated detection signals 201, 202, 203 may be determined according to a predetermined start time schedule which defines a default start time. The start time of a particular frequency modulated detection signal may be offset relative to the default start time defined in the schedule based on a random value. The start time schedule may comprise an ordered plurality of scheduled start times 205 which inform the controller 101 as to the appropriate start time 205 to use for each of the consecutive frequency modulated detection signals 201, 202, 203. Each of the scheduled start times in the schedule of start times may be different. The schedule may, for example, state that a signal should be emitted at 5 ms intervals. The emitted start time 205 of the frequency modulated detection signal 201, 202, 203 may be offset from the scheduled start time based on the random value. Alternatively, the start time schedule may comprise a plurality of start time delays, such that the start time is measured relative to the end of either a preceding frequency modulated detection signal 201, 202, 203 or relative to an emission window 212. In such an example, the schedule may, for example, state that each signal should be emitted 1 ms after the emission of the preceding signal.

The end time 207 of each of the plurality of frequency modulated detection signals 201, 202, 203 may be determined according to a predetermined end time schedule and may be offset from the schedule based on a random value. The end time schedule comprises an ordered plurality of scheduled end times which inform the controller 101 as to the appropriate end time 207 to use for each of the consecutive frequency modulated detection signals. Each of the scheduled end times in the schedule of end times may be different 201, 202, 203. The emitted end time 207 of the frequency modulated detection signal 201, 202, 203 may be offset from the scheduled end time 207 based on the random value. Alternatively, the end time schedule may define the end times relative to the end of either a preceding frequency modulated detection signal or relative to an emission window 212.

Accordingly, the start and end time schedules may define a regular, periodic schedule for emission of frequency modulated detection signals or an irregular schedule. In either instance, the random offset may be applied relative to the default start/end time defined in the schedule.

In FIG. 3, the schedule defines a regular periodic start time and is represented for each of the frequency modulated detection signals 201, 202, 203 by lines 213. Similarly, the schedule defines regular periodic end times and is represented for each of the frequency modulated detection signals 201, 202, 203 by lines 215. It can be seen that the start time 205 and the end time 207 of the second frequency modulated detection signal are offset by a positive amount 220, i.e. the frequency modulated detection signal starts to emit and ends emission at a later time than scheduled. In contrast, the start time 205 and the end time 207 of the third frequency modulated detection signal 203 is offset by a different, negative, amount in comparison to the scheduled start and end times, as represented by line 216.

In the example of FIG. 3, the initial and final frequencies are not randomly offset and are instead defined in a regular manner by the initial frequency and final frequency schedules.

The initial frequency schedule may comprise a predetermined plurality of initial frequencies 204 defining the frequencies at which the frequency modulated detection signals should start at. The start time schedule may define a plurality of time spaced start times 205.

The final frequency schedule may comprise a predetermined plurality of final frequencies 206 defining the frequencies at which the frequency modulated detection signal should end at. The end time schedule may define a plurality of time spaced end times 207.

The frequency modulated detection signals 201, 202, 203 are emitted in a consecutive manner, such that one signal does not overlap with either its predecessor or successor. The frequency modulated detection signals 201, 202, 203 may be emitted discretely such that after the emission of the final frequency 206 of the frequency modulated detection signal 201, 202, 203, there may be a period during which no signal is emitted from the FMCW radar system 102 before the next frequency modulated detection signal 201, 202, 203 begins.

Alternatively, a continuous output may be emitted by the FMCW radar system 201, 202, 203 such that, after the emission of the final frequency 206 of a first frequency modulated detection signal 201, one or more of at least one pause signal 217 and a ramp signal 218 may be emitted by the FMCW radar system 102. A pause signal 217 may comprise the emission of a non-changing frequency over a period of time. A pause signal 217 may directly precede a ramp signal 218 and/or succeed a ramp signal 218. A ramp signal 218 may comprise a signal wherein the frequency varies from the final frequency 206 of the frequency modulated detection signal 201, 202, 203 to the initial frequency 204 of a subsequent frequency modulated detection signal 201, 202, 203.

For an offset applied to one or more of the initial frequency 204 and the final frequency 206, the ramp signal 218 may vary from the offset final frequency 206 to the offset initial frequency 204, from the final frequency 206 to the offset initial frequency 204 or from the offset final frequency 206 to the initial frequency 204. The pause signals may be provided before and after each frequency modulated detection signal and may provide a temporal space in which the offset can be applied prior to the frequency emitted by the frequency FMCW system proceeding from the final preceding frequency modulated detection signal to the initial frequency of the subsequent frequency modulated detection signal.

In these examples, the offset to one or more of: the start time 205 of the frequency modulated detection signal 201, 202, 203; the end time 207 of the frequency modulated detection signal 201, 202, 203; the initial frequency 204 of the frequency modulated detection signal 201, 202, 203 and the final frequency 206 of the frequency modulated detection signal 201, 202, 203 may be provided to at least two of the frequency modulated signals 202, 203. It will be further appreciated that an offset to one or more of the parameters 204, 205, 206, 207 may be applied to any number of the frequency modulated detection signals 201, 202, 203 or all of the frequency modulated detection signals 201, 202, 203. Where an offset is applied to the parameters 204, 205, 206, 207 of more than one of the frequency modulated detection signals 201, 202, 203, the offset applied to each detection signal may be based on a different random value, such as those generated by a random value generator 104. For an offset applied to more than one of the parameters 204, 205, 206, 207 of a single frequency modulated detection signals 201, 202, 203, the same random value may be used or a different random value may be used. For example, the same offset, based on a first random value, may be applied to both of the start time 205 and the end time 207. For the same frequency modulated detection signal, a second offset, based on a second random value, may be applied to one or both of the initial frequency 204 and the final frequency 206.

FIGS. 2 and 3 show embodiments wherein the FMCW radar system 102 provides for detection of reflected signals 106 according to a predetermined detection schedule 219. The predetermined detection schedule 219 may be independent of any offset applied to the one or more of the start time 205, the end time 207, the initial frequency 204 and the final frequency 206 of each of the frequency modulated detection signals 201, 202, 203. By providing for detection and ranging according to a predetermined schedule, the range of frequencies detected for two frequency modulated detection signals 201, 202, 203 with a difference between at least one of their start times, their end times 207, their initial frequencies 204 and their final frequencies 206 will be different. By providing a system whereby the detected reflected signal frequencies vary between at least two of the frequency modulated detection signals 201, 202, 203, errors caused by the detection of signals with similar frequencies may be reduced, because similar signals from other devices may be unlikely to be offset by the same amounts according to one or more random values.

Figure 4:
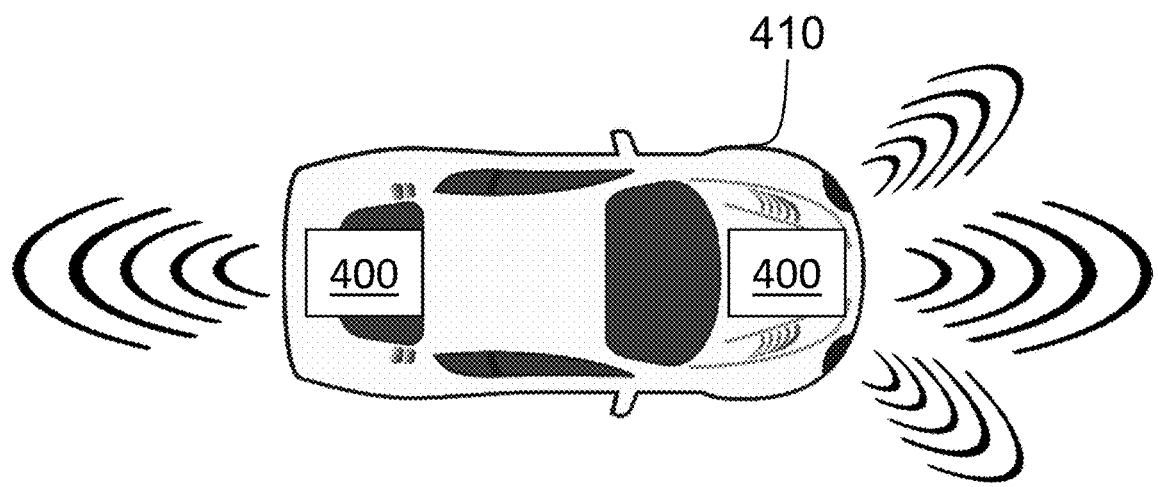
FIG. 4 shows an example automobile comprising a FMCW radar system.

FIG. 4 shows an automobile 410 that may comprise the apparatus 400. The automobile may comprise a car, a self-driving car, a truck, a lorry, a van, a caravan, a motor-bike, a utility vehicle, a boat, a ship, a drone, an aircraft or an emergency services vehicle. In some embodiments, the apparatus 400 may be in communication with an automatic braking system of the vehicle. During operation, the controller 101 and the random value generator 104 may operate together in order to provide signalling to the FMCW radar system 102 in order to provide for the effective detection of remote objects 103. If a remote object 103 is detected to be within a predetermined distance from the automobile 410, signalling may be sent from the FMCW radar system 102 or the controller 101 to the car for further action, such as the automatic braking system in order to control the automobile 410 to slow down or stop. In other embodiments, the apparatus 400 may be configured to provide a warning to the driver and/or passengers of the automobile 410 by way of an audio warning, a visual warning on a dashboard, or another suitable warning system.

Figure 5:
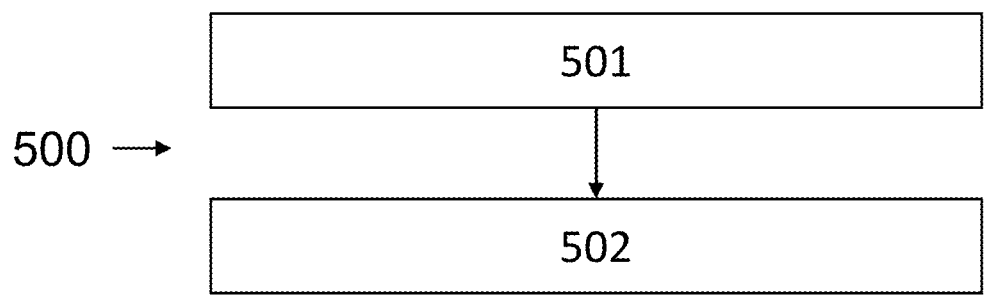
FIG. 5 shows an example method.
Figure 6:
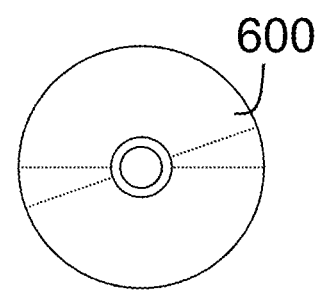
FIG. 6 shows an example computer readable medium.

FIG. 5 shows a flow chart representing the steps of a method 500 of the present disclosure. The method of controlling a FMCW radar system comprises: providing 501 for emission by the FMCW radar system of a plurality of consecutive frequency modulated detection signals for detection and ranging, each of the frequency modulated detection signals varying between an initial frequency and a final frequency over a period of time extending from a start time of the frequency modulated detection to an end time of the frequency modulated detection signal; and providing 502 at least one of the frequency modulated detection signals with an offset to one or more of: the start time of the frequency modulated detection signal relative to a predetermined start schedule; the end time of the frequency modulated detection signal relative to a predetermined end time schedule; the initial frequency of the frequency modulated detection signal relative to a predetermined initial frequency schedule; and the final frequency of the frequency modulated detection signal relative to a predetermined final frequency schedule, the offset based on a random value.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments, the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs) having memory associated therewith. The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

In another aspect of the present disclosure, there is a computer program configured to perform the method described above. In an example the computer program is provided by a computer program product 600 comprising a computer readable medium bearing computer program code for execution by a processor associated memory, the computer program code comprising code for performing the method described above. The computer program may be executed by a processor of a FMCW radar system 102 or a processor in communication with the FMCW radar system 102 and/or the controller.

The invention claimed is:

1. A controller for a Frequency Modulated Continuous Wave, FMCW, radar system configured to:
provide for emission by the FMCW radar system of a plurality of consecutive frequency modulated detection signals for detection and ranging, each of the frequency modulated detection signals varying between an initial frequency and a final frequency over a period of time extending from a start time of the frequency modulated detection signal to an end time of the frequency modulated detection signal; wherein at least one of said consecutive frequency modulated detection signals is provided with a first offset to one or more of:
the start time of the frequency modulated detection signal relative to a predetermined start time schedule; and
the end time of the frequency modulated detection signal relative to a predetermined end time schedule; and
the at least one frequency modulated detection signals are provided with a second offset to one or more of:
the initial frequency of the frequency modulated detection signal relative to a predetermined initial frequency schedule; and
the final frequency of the frequency modulated detection signal relative to a predetermined final frequency schedule;
the offsets based on random values.

2. The controller for a FMCW radar system of claim 1 wherein the random values are pseudo-random values.

3. The controller for a FMCW radar system of claim 2 wherein the pseudo-random values are generated by linear-feedback shift registers.

4. The controller for a FMCW radar system of claim 1 wherein the offsets each comprise a maximum offset value multiplied by a factor between −1 and 1, the factor determined from the random value.

5. The controller for a FMCW radar system of claim 1 wherein the time difference between the start time and the end time comprises a fixed predetermined time and, correspondingly, any first offset applied to one of the start time and the end time is equally applied to the other of the end time and the start time.

6. The controller for a FMCW radar system of claim 1 wherein the frequency difference between the initial frequency and the final frequency comprises a fixed predetermined frequency difference and, correspondingly, any second offset applied to one of the initial frequency and the final frequency is equally applied to the other of the final frequency and the initial frequency.

7. The controller for a FMCW radar system of claim 1 wherein the start time and end time schedules define non-overlapping emission windows, each of the plurality of frequency modulated detection signals is emitted during one of the non-overlapping emission window, and wherein the first offset to one or more of the start time of the frequency modulated detection signal and the end time of the frequency modulated signal is offset relative to the start of or the end of the emission window respectively.

8. The controller for a FMCW radar system of claim 1, wherein each of the plurality of frequency modulated detection signals is separated by at least one pause signal, which comprises a signal wherein the frequency emitted by the FMCW radar system remains constant, and a ramp signal, which comprises a signal wherein the frequency emitted by the FMCW radar system varies monotonically from the final frequency to the initial frequency.

9. The controller for a FMCW radar system of claim 7 wherein the FMCW radar system is configured to provide for continuous emission of at least two of the frequency modulated detection signals separated by the ramp signal and the controller provides for application of the offsets to at least one of the frequency modulated detection signals.

10. The controller for a FMCW radar system of claim 1 wherein the controller provides for detection of a reflected detection and ranging signal according to a predetermined detection schedule which is independent of any offsets applied to the one or more of the start time, the end time, the initial frequency or the final frequency.

11. The controller for a FMCW radar system of claim 1 wherein one or more of:
the start time or end time schedule defines regular time points at which a frequency modulated detection signal starts or ends respectively;
the start time or end time schedule defines a time point at which a frequency modulated detection signal should be emitted relative to the preceding frequency modulated detection signal;
the initial frequency schedule defines a default initial frequency; and
the final frequency schedule defines a default final frequency.

12. An apparatus comprising:
a FMCW radar system controlled by a controller, the controller configured to:
provide for emission by the FMCW radar system of a plurality of consecutive frequency modulated detection signals for detection and ranging, each of the frequency modulated detection signals varying between an initial frequency and a final frequency over a period of time extending from a start time of the frequency modulated detection signal to an end time of the frequency modulated detection signal; wherein at least one of said consecutive frequency modulated detection signals is provided with a first offset to one or more of:
the start time of the frequency modulated detection signal relative to a predetermined start time schedule; and
the end time of the frequency modulated detection signal relative to a predetermined end time schedule; and
the at least one frequency modulated detection signals are provided with a second offset to one or more of:
the initial frequency of the frequency modulated detection signal relative to a predetermined initial frequency schedule; and
the final frequency of the frequency modulated detection signal relative to a predetermined final frequency schedule;
the offsets based on random values; and
a random value generator configured to provide the random values to the controller.

13. An automobile comprising the apparatus system of claim 12.

14. A method of controlling a FMCW radar system comprising:
providing for emission by the FMCW radar system of a plurality of consecutive frequency modulated detection signals for detection and ranging, each of the frequency modulated detection signals varying between an initial frequency and a final frequency over a period of time extending from a start time of the frequency modulated detection to an end time of the frequency modulated detection signal;
providing at least one of the frequency modulated detection signals with a first offset to one or more of: the start time of the frequency modulated detection signal relative to a predetermined start schedule; the end time of the frequency modulated detection signal relative to a predetermined end time schedule; and providing the at least one frequency modulated detection signal with a second offset to one or more of: the initial frequency of the frequency modulated detection signal relative to a predetermined initial frequency schedule; and the final frequency of the frequency modulated detection signal relative to a predetermined final frequency schedule, the offsets based on random values.

15. A non-transitory computer readable medium comprising computer program code which, when executed by a processor, is configured to perform the method of claim 14.

16. The method of claim 14 wherein the random values are pseudo-random values generated by a linear-feedback shift register.

17. The method of claim 14 wherein the offsets comprise a maximum offset value multiplied by a factor between −1 and 1, the factor determined from the random values.

18. The method of claim 14 wherein the time difference between the start time and the end time comprises a fixed predetermined time and, correspondingly, any first offset applied to one of the start time and the end time is equally applied to the other of the end time and the start time.

19. The method of claim 14 wherein the frequency difference between the initial frequency and the final frequency comprises a fixed predetermined frequency difference and, correspondingly, any second offset applied to one of the initial frequency and the final frequency is equally applied to the other of the final frequency and the initial frequency.

20. The method of claim 14 further comprising providing for detection of a reflected detection and ranging signal according to a predetermined detection schedule which is independent of any offset applied to the one or more of the start time, the end time, the initial frequency or the final frequency.

* * * * *